United States Patent
Kim et al.

(10) Patent No.: US 10,648,850 B2
(45) Date of Patent: May 12, 2020

(54) DEVICES AND METHODS FOR DETERMINING AIRCRAFT WEIGHT

(71) Applicant: The Boeing Company, Chicago, IL (US)

(72) Inventors: Geun I. Kim, Chicago, IL (US); John W. Alaimo, Jr., Chicago, IL (US); Theresa J. Hirsch, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 234 days.

(21) Appl. No.: 15/968,459

(22) Filed: May 1, 2018

(65) Prior Publication Data

US 2019/0339111 A1 Nov. 7, 2019

(51) Int. Cl.
| | |
|---|---|
| *G01G 19/12* | (2006.01) |
| *G01G 9/00* | (2006.01) |
| *B64D 43/00* | (2006.01) |
| *G05D 1/04* | (2006.01) |

(52) U.S. Cl.
CPC .............. *G01G 19/12* (2013.01); *B64D 43/00* (2013.01); *G01G 9/00* (2013.01); *G05D 1/042* (2013.01)

(58) Field of Classification Search
CPC .......... G01G 19/12; G01G 9/00; G01G 19/07; B64D 43/00; G05D 1/042
See application file for complete search history.

(56) References Cited

U.S. PATENT DOCUMENTS

| | | | | |
|---|---|---|---|---|
| 2,701,111 A | * | 2/1955 | Schuck | G05D 1/0607 244/181 |
| 3,128,967 A | * | 4/1964 | Hays, Jr. | G05D 1/063 244/181 |
| 8,849,480 B2 | | 9/2014 | Elias et al. | |
| 2014/0249700 A1 | * | 9/2014 | Elias | G01M 1/127 701/14 |

* cited by examiner

*Primary Examiner* — Adam R Mott
(74) *Attorney, Agent, or Firm* — McDonnell Boehnen Hulbert & Berghoff LLP (57) ABSTRACT

An example method for in-flight determination of a gross weight of an aircraft includes causing an aircraft to perform a first flight operation defined by a first airspeed that is substantially constant and a descent rate that is substantially constant, determining the first airspeed and a first thrust that caused the aircraft to perform the first flight operation, the first thrust being substantially constant during the first flight operation, causing the aircraft to perform a second flight operation defined by a second airspeed that is substantially constant and a descent rate that is substantially constant, determining the second airspeed and a second thrust that caused the aircraft to perform the second flight operation, the second thrust being substantially constant during the second flight operation, and using the first thrust, the second thrust, the first airspeed, and the second airspeed to determine the gross weight of the aircraft.

20 Claims, 5 Drawing Sheets

DEVICES AND METHODS FOR DETERMINING AIRCRAFT WEIGHT

FIELD

The present disclosure generally relates to devices and methods for determining a gross weight of an aircraft, and more specifically to devices and methods for determining a gross weight of an aircraft while the aircraft is in flight.

BACKGROUND

The gross weight of an aircraft will generally decrease as the aircraft burns fuel during flight. The more accurately the changing gross weight of the aircraft can be determined during flight, the more accurately flight parameters or related information such as heading, thrust, altitude, airspeed, descent rate, and time of arrival can be determined for a given flight plan to increase fuel efficiency and/or reduce the release of carbon dioxide into the atmosphere.

Existing methods for determining the gross weight of an aircraft during flight include subtracting the weight of fuel that has been burned during flight from the known initial gross weight of the aircraft (e.g., the aircraft's "zero fuel weight" plus the weight of the fuel initially onboard the aircraft). One way of determining the amount of fuel burned during flight is to monitor the amount of unburned fuel that remains in the fuel tank with a float sensor. However, float sensors can be unreliable if the aircraft is not engaged in level flight or for other reasons. Another way of determining the amount of fuel burned during flight is to monitor the amount of fuel that flows from the tank to the engines. Many aircraft have multiple fuel tanks and, as a result, the fuel remaining in each tank or the fuel that flows out of each tank must be monitored and is subject to measurement error. For either of the methods described above, these errors can compound significantly, especially over long flights. Both methods also rely on knowledge of the aircraft's zero fuel weight, the initial fuel weight, and/or the initial gross weight of the aircraft, and difficulties arise if that information is difficult to obtain. This creates a need for systems and methods for in-flight aircraft gross weight determination that are not dependent on knowledge of the zero fuel weight of the aircraft and/or the weight of its initial load of fuel, and that are not dependent on determining the fuel remaining in the tank or the fuel that has been burned during flight.

SUMMARY

A first example of the disclosure is a computing device that includes one or more processors and a computer-readable medium storing instructions that, when executed by the one or more processors, cause the computing device to perform functions for in-flight determination of a gross weight of an aircraft. The functions include causing the aircraft to perform a first flight operation defined by a first airspeed that is substantially constant and a descent rate that is substantially constant. The functions further include determining the first airspeed and a first thrust that caused the aircraft to perform the first flight operation, the first thrust being substantially constant during the first flight operation. The functions further include causing the aircraft to perform a second flight operation defined by a second airspeed that is substantially constant and a descent rate that is substantially constant. The functions further include determining the second airspeed and a second thrust that caused the aircraft to perform the second flight operation, the second thrust being substantially constant during the second flight operation. The functions further include using the first thrust, the second thrust, the first airspeed, and the second airspeed to determine the gross weight of the aircraft.

A second example of the disclosure is a non-transitory computer readable medium storing instructions that, when executed by a computing device, cause the computing device to perform functions for in-flight determination of a gross weight of an aircraft. The functions include causing an aircraft to perform a first flight operation defined by a first airspeed that is substantially constant and a descent rate that is substantially constant. The functions further include determining the first airspeed and a first thrust that caused the aircraft to perform the first flight operation, the first thrust being substantially constant during the first flight operation. The functions further include causing the aircraft to perform a second flight operation defined by a second airspeed that is substantially constant and a descent rate that is substantially constant. The functions further include determining the second airspeed and a second thrust that caused the aircraft to perform the second flight operation, the second thrust being substantially constant during the second flight operation. The functions further include using the first thrust, the second thrust, the first airspeed, and the second airspeed to determine the gross weight of the aircraft.

A third example of the disclosure is a method for in-flight determination of a gross weight of an aircraft. The method includes causing an aircraft to perform a first flight operation defined by a first airspeed that is substantially constant and a descent rate that is substantially constant. The method further includes determining the first airspeed and a first thrust that caused the aircraft to perform the first flight operation, the first thrust being substantially constant during the first flight operation. The method further includes causing the aircraft to perform a second flight operation defined by a second airspeed that is substantially constant and a descent rate that is substantially constant. The method further includes determining the second airspeed and a second thrust that caused the aircraft to perform the second flight operation, the second thrust being substantially constant during the second flight operation. The method further includes using the first thrust, the second thrust, the first airspeed, and the second airspeed to determine the gross weight of the aircraft.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

As discussed above, there exists a need for systems and methods for in-flight aircraft gross weight determination that are not dependent on knowledge of the zero fuel weight of the aircraft and/or the weight of its initial load of fuel, and that are not dependent on determining the fuel remaining in the tank or the fuel that has been burned during flight. Accordingly, such systems and methods are disclosed herein.

Within examples, a computing device (e.g., a flight management computer) causes an aircraft to perform a first flight operation defined by a first airspeed that is substantially constant and a descent rate that is substantially constant. That is, the first flight operation might involve the aircraft flying at a constant horizontal airspeed and a constant (e.g., zero or non-zero) vertical rate of displacement. The first flight operation might involve the aircraft "cruising" at a constant airspeed and altitude as part of a flight path that connects the aircraft's origin and destination. In other examples, the first flight operation is a (e.g., slight) deviation from such a flight path. Once the aircraft performs the first flight operation, the computing device can determine the first airspeed and a first thrust that caused the aircraft to perform the first flight operation. The first thrust is substantially constant during the first flight operation. For instance, the computing device can determine the first airspeed by using a pitot tube or another sensor, and can determine the first thrust using known correlations between a thrust output of a particular engine and its power setting (e.g., revolutions per minute).

By further example, the computing device causes the aircraft to perform a second flight operation defined by a second airspeed that is substantially constant and a descent rate that is substantially constant. That is, the second flight operation might involve the aircraft flying at a constant horizontal airspeed and a constant (e.g., zero or non-zero) vertical rate of displacement. The second flight operation might involve the aircraft "cruising" at a constant airspeed and altitude as part of a flight path that connects the aircraft's origin and destination. In other examples, the second flight operation is a (e.g., slight) deviation from such a flight path. Once the aircraft performs the second flight operation, the computing device can determine the second airspeed and a second thrust that caused the aircraft to perform the second flight operation. The second thrust is substantially constant during the second flight operation. For instance, the computing device can determine the second airspeed by using a pitot tube or another sensor, and can determine the second thrust using known correlations between a thrust output of a particular engine and its power setting (e.g., revolutions per minute).

Then, the computing device can use the first thrust, the second thrust, the first airspeed, and the second airspeed to determine the gross weight of the aircraft. More specifically, the computing device can determine a drag coefficient of the aircraft that represents a quotient of (A) a difference between the first thrust and the second thrust divided by (B) one half of a multiplicative product of (i) a density of air outside the aircraft, (ii) an area of a wing of the aircraft, and (iii) a difference between a square of the first airspeed and a square of the second airspeed. This relationship between the drag coefficient of the aircraft and the first thrust, the second thrust, the square of the first airspeed, and the square of the second airspeed is based on the drag equation and assumptions that the thrust acting on the aircraft is equal to the drag acting on the aircraft (i.e., constant airspeed) during both the first flight operation and the second flight operation, and that during the transition from the first flight operation to the second flight operation, the drag coefficient of the aircraft doesn't substantially change and the density of air outside the aircraft doesn't substantially change. These assumptions are generally valid due to the small relative changes in airspeed and altitude that occur during the transition from the first flight operation to the second flight operation.

Next, the computing device can apply a reverse drag polar function of the aircraft to the drag coefficient to determine a lift coefficient of the aircraft. The reverse polar drag function is a tabulated function that maps drag coefficient to lift coefficient for a particular aircraft. Finally, the computing device can use the determined lift coefficient as an input to the lift equation to determine the lift force that is applied to the aircraft during the second flight operation. More specifically, the computing device can multiply the lift coefficient by one half of a multiplicative product of (1) the density of air outside the aircraft, (2) the square of the second airspeed, and (3) the area of the wing of the aircraft to determine the lift force acting on the aircraft. During the second flight operation the aircraft has a constant descent rate, and thus the lift acting on the aircraft is equal to the gross weight of the aircraft.

Disclosed embodiments will now be described more fully hereinafter with reference to the accompanying Drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Figure 1:
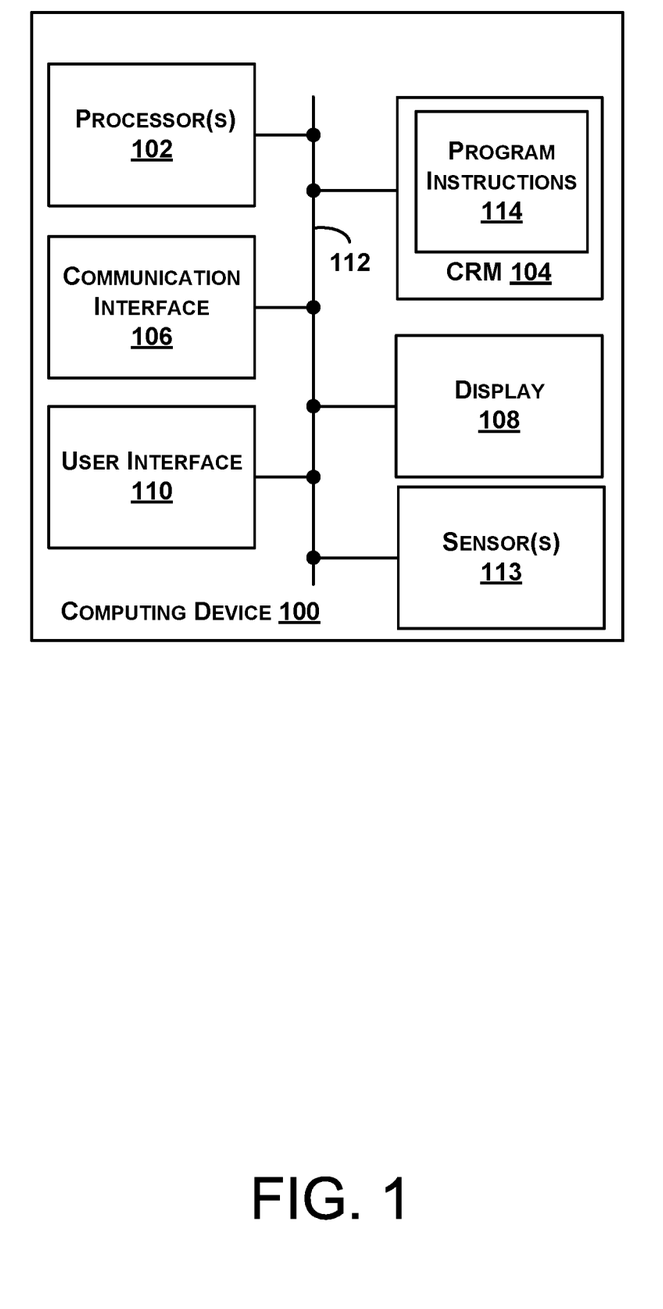
FIG. 1 is a schematic diagram of a computing device, according to an example embodiment.

Referring now to FIG. 1, an example computing device 100 is illustrated. In some examples, components illustrated in FIG. 1 may be distributed across multiple computing devices. However, for the sake of example, the components are shown and described as part of one example computing device 100. The computing device 100 may be or include a mobile device (such as a mobile phone), a desktop computer, a laptop computer, a tablet computer, an integrated flight computer, a server, a network of multiple servers, or similar device(s) that may be configured to perform the functions described herein.

As shown in FIG. 1, the computing device 100 includes one or more processors 102, a computer-readable medium 104 storing program instructions 114, a communication interface 106, a display 108, a user interface 110, and sensor(s) 113. Components illustrated in FIG. 1 are linked together by a system bus, network, or other connection mechanism 112. The computing device 100 may also include hardware to enable communication within the computing device 100 and between the computing device 100 and one or more other devices. The hardware may include transmitters, receivers, and antennas, for example.

The one or more processors 102 may be any type of processor, such as a microprocessor, digital signal processor, multicore processor, etc., coupled to the computer-readable medium 104. The computer-readable medium 104 may be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the computer-readable medium 104 is configured to store program instructions 114. The program instructions 114 are executable by the one or more processors 102 to cause the computing device 100 to perform any of the functions described herein.

The communication interface 106 is configured to facilitate communication with one or more other devices, in accordance with one or more wired or wireless communication protocols. For example, the communication interface 106 may be configured to facilitate wireless data communication for the computing device 100 according to one or more wireless communication standards, such as one or more IEEE 801.11 standards, ZigBee standards, Bluetooth standards, etc. As another example, the communication interface 106 may be configured to facilitate wired data communication with one or more other devices.

The display 108 may be any type of display component configured to display data or images. As one example, the display 108 may include a touchscreen display. As another example, the display 108 may include a flat-panel display, such as a liquid-crystal display (LCD) or a light-emitting diode (LED) display.

The user interface 110 includes one or more pieces of hardware used to provide data and control signals to the computing device 100. For instance, the user interface 110 may include a mouse or a pointing device, a keyboard or a keypad, a microphone, a touchpad, or a touchscreen, among other possible types of input devices. Generally, the user interface 110 may allow an operator to interact with a graphical user interface (GUI) displayed by the computing device 100 (e.g., the display 108).

The sensors 113 can include one or more sensors for detecting airspeed of an aircraft (e.g., a pitot tube), an altimeter, a gyroscope, fuel flow sensors, fuel tank (e.g., float) sensors, engine power sensors (e.g., a tachometer), and/or an air pressure sensor. Other sensors are possible.

Figure 2:
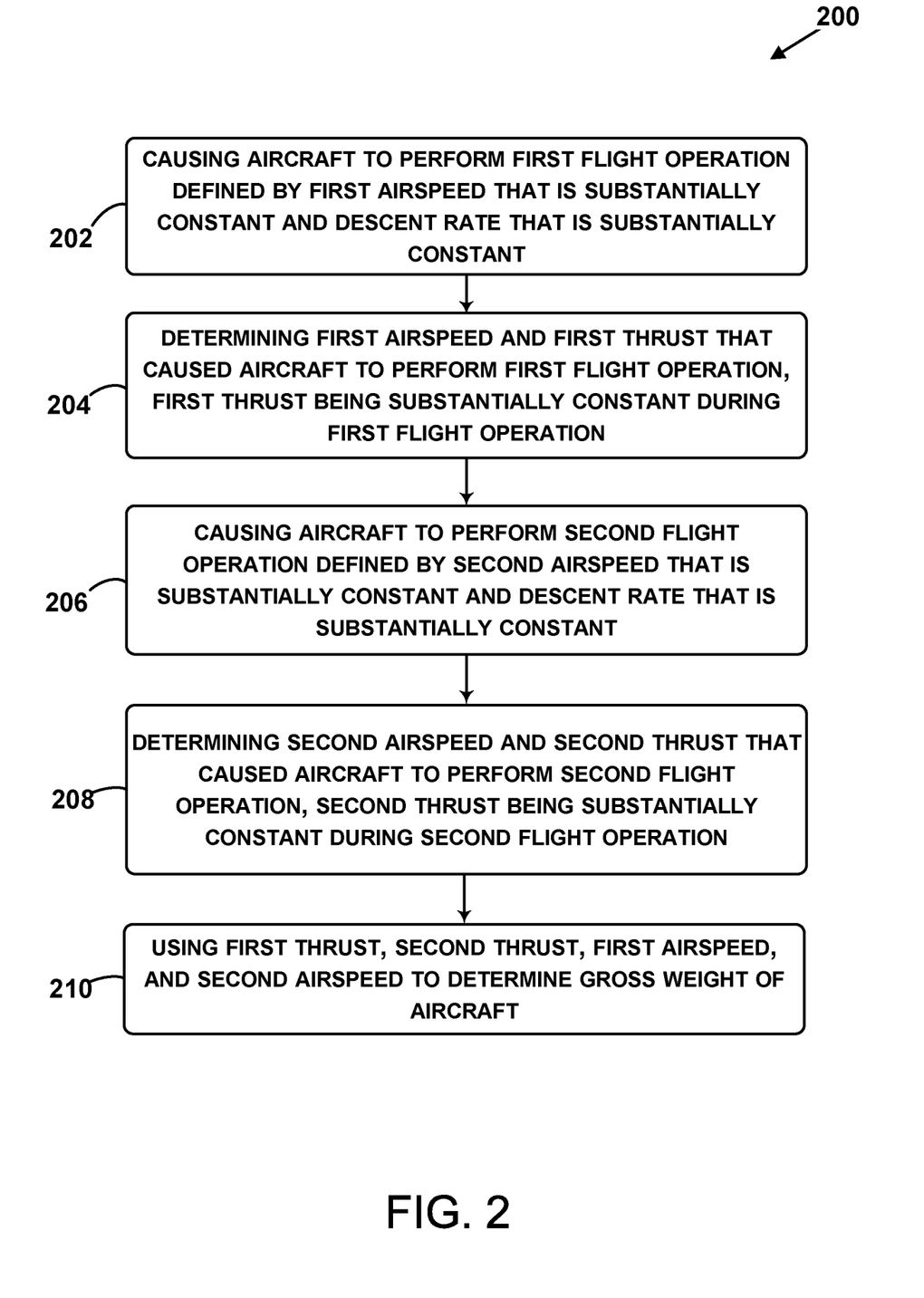
FIG. 2 is a block diagram of a method for in-flight determination of a gross weight of an aircraft, according to an example embodiment.

Referring to FIG. 2, the method 200 is an example method for in-flight determination of a gross weight of an aircraft. Although blocks 202, 204, 206, 208, and 210 are illustrated in a sequential order, these blocks may in some instances be performed in parallel, and/or in a different order than those described herein. Also, the various blocks may be combined into fewer blocks, divided into additional blocks, and/or removed based upon the desired implementation. In addition, for the method 200 and other processes and methods disclosed herein, each block in FIG. 2 can represent hardware or circuitry that is wired or configured to perform the processes and methods disclosed herein.

Figure 3:
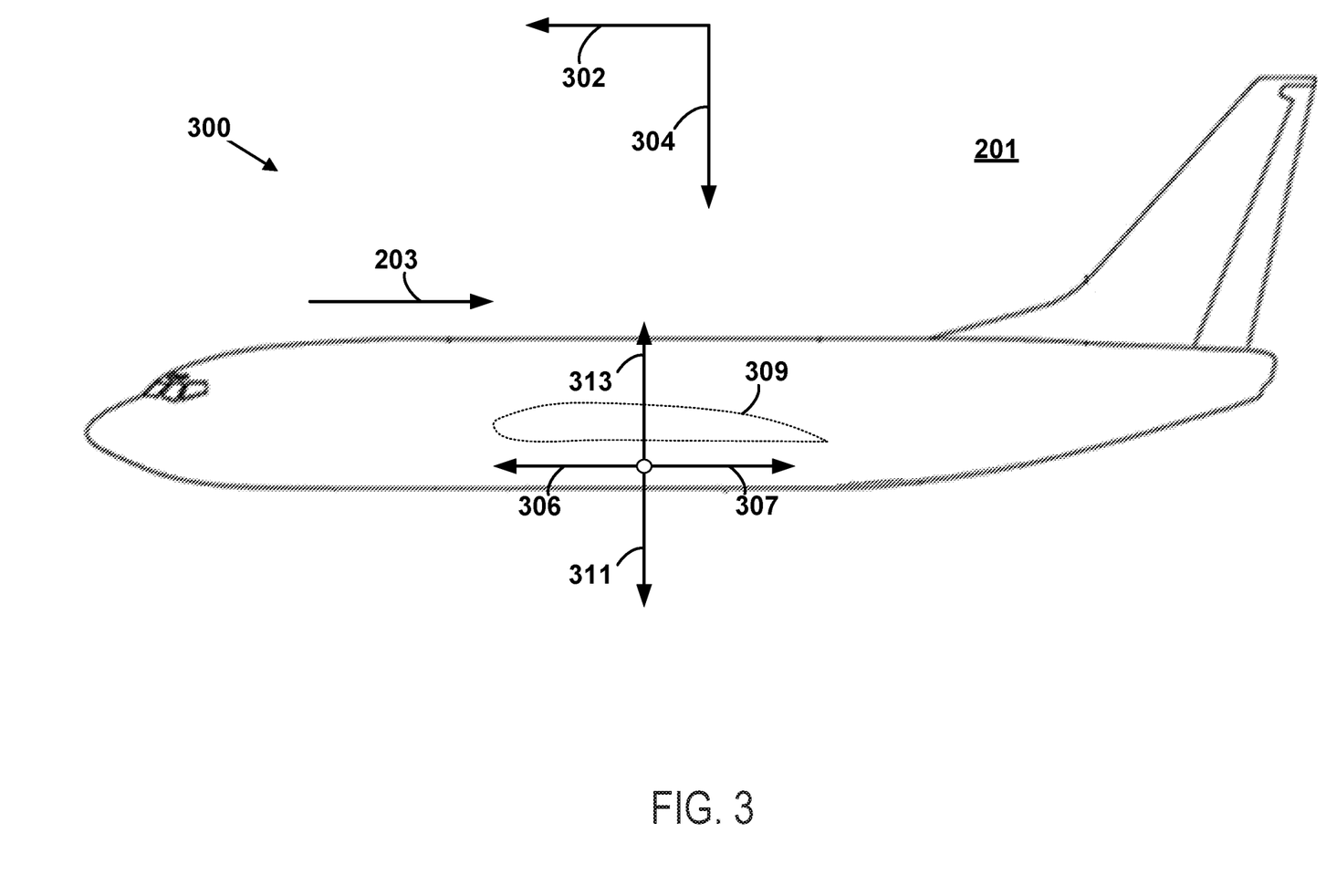
FIG. 3 is a schematic diagram of an aircraft, according to an example embodiment.

At block 202, the method 200 includes causing an aircraft to perform a first flight operation defined by a first airspeed that is substantially constant and a descent rate that is substantially constant. Referring to FIG. 3, for example, the computing device 100 (e.g., a computing device onboard an aircraft 300) can cause the aircraft 300 to perform a first flight operation defined by a first airspeed 302 (e.g., parallel to the ground) that is substantially constant and a descent rate 304 (e.g., perpendicular to the ground) that is substantially constant. That is, the aircraft 300 can perform the first flight operation in response to receiving commands and/or control signals from the computing device 100 or another (e.g., manually operated) control system of the aircraft 300. Engines or propellers of the aircraft 300 can receive control signals from the computing device 100 or another control system and provide thrust according to the received control signals. Additionally, control surfaces (e.g., rudders, flaps, etc.) of the aircraft 300 can receive control signals from the computing device 100 or another control system of the aircraft 300 and pivot, deflect, or turn according to the received control signals. In this context, it can be assumed that a first thrust 306 acting on the aircraft 300 is substantially equal to a drag force 307 acting on the aircraft 300 (e.g., due to air resistance) and that a lift force 313 acting on the aircraft 300 (e.g., due to airflow over a wing 309 of the aircraft 300) is substantially equal to a gross weight 311 of the aircraft 300 at the time shown in FIG. 3.

For instance, the computing device 100 can control one or more engines or propellers of the aircraft 300 to provide the first thrust 306 that results in the aircraft 300 flying at the first airspeed 302 (e.g., a predetermined airspeed). That is, the computing device 100 could control the thrust output of the engines or propellers while monitoring the airspeed of the aircraft 300 until the airspeed is equal to the first airspeed 302 and the rate of change of the airspeed is substantially equal to zero.

In various examples, the descent rate 304 could be negative (e.g., the aircraft 300 is ascending), positive (e.g., the aircraft 300 is descending), or substantially equal to zero (e.g., the aircraft 300 is engaged in level flight).

The first flight operation might involve the aircraft 300 "cruising" at a constant airspeed and constant altitude as part of a flight path that connects the origin and destination of the aircraft 300. In other examples, the first flight operation is a (e.g., slight) deviation from such a flight path.

At block 204, the method 200 includes determining the first airspeed and a first thrust that caused the aircraft to perform the first flight operation, the first thrust being substantially constant during the first flight operation. For example, the computing device 100 can determine the first airspeed 302 and the first thrust 306 that caused the aircraft 300 to perform the first flight operation. In this context, the first thrust 306 is substantially constant during the first flight operation. In a specific example, the computing device 100 can determine the first airspeed 302 via the sensor(s) 113 (e.g., a pitot tube or another sensor configured to detect the airspeed of the aircraft 300). Also, the computing device 100 can determine the first thrust 306 by referring to engine power control commands that the computing device 100 sent to the engines or propellers of the aircraft 300 during the first flight operation. For example, the computing device 100 can access data that maps engine or propeller power settings to thrust levels. In this context, determining the first thrust might include determining the engine or propeller power settings that were used to perform the first flight operation without directly determining a thrust force.

Figure 4:
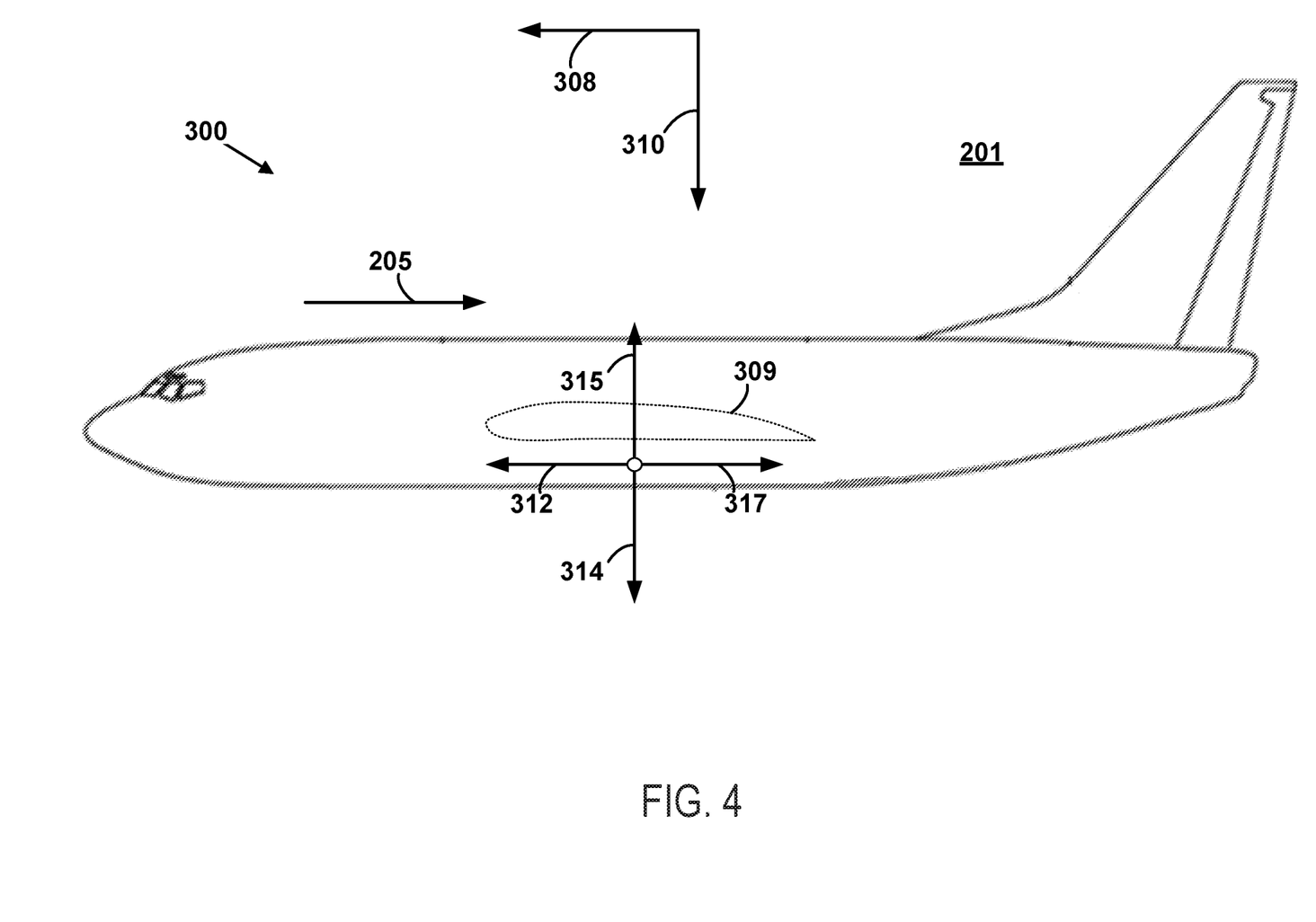
FIG. 4 is a schematic diagram of an aircraft, according to an example embodiment.

At block 206, the method 200 includes causing the aircraft to perform a second flight operation defined by a second airspeed that is substantially constant and a descent rate that is substantially constant. Referring to FIG. 4, for example, the computing device 100 can cause the aircraft 300 to perform a second flight operation defined by a second airspeed 308 (e.g., parallel to the ground) that is substantially constant and a descent rate 310 (e.g., perpendicular to the ground) that is substantially constant. That is, the aircraft 300 can perform the second flight operation in response to receiving commands and/or control signals from the computing device 100 or another (e.g., manually operated) control system of the aircraft 300. Engines or propellers of the aircraft 300 can receive control signals from the computing device 100 or another control system and provide thrust according to the received control signals. Additionally, control surfaces (e.g., rudders, flaps, etc.) of the aircraft 300 can receive control signals from the computing device 100 or another control system of the aircraft 300 and pivot, deflect, or turn according to the received control signals. The aircraft 300 may perform the second flight operation after performing the first flight operation depicted in FIG. 3. In this context, it can be assumed that a second thrust 312 acting on the aircraft 300 is substantially equal to a drag force 317 (e.g., due to air resistance) acting on the aircraft 300 and that a lift force 315 acting on the aircraft 300 (e.g., due to airflow over a wing 309 of the aircraft 300) is substantially equal to a gross weight 314 of the aircraft 300 at the time shown in FIG. 4.

For instance, the computing device 100 can control one or more engines or propellers of the aircraft 300 to provide the second thrust 312 that results in the aircraft 300 flying at the second airspeed 308 (e.g., a predetermined airspeed). That is, the computing device 100 could control the thrust output of the engines or propellers while monitoring the airspeed of the aircraft 300 until the airspeed is equal to the second airspeed 308 and the rate of change of the airspeed is substantially equal to zero.

In various examples, the descent rate 310 could be negative (e.g., the aircraft 300 is ascending), positive (e.g., the aircraft 300 is descending), or substantially equal to zero (e.g., the aircraft 300 is engaged in level flight).

The second flight operation might involve the aircraft 300 "cruising" at a constant airspeed and constant altitude as part of a flight path that connects the origin and destination of the aircraft 300. In other examples, the second flight operation is a (e.g., slight) deviation from such a flight path.

In some examples, the computing device 100 makes a determination that a difference in air temperature outside the aircraft 300 during the first flight operation as compared to during the second flight operation will be less than a threshold amount (e.g., less than 1° C. difference, less than 5% difference, etc.). For instance, the computing device 100 might determine that the air temperature outside the aircraft 300 will not change significantly due to the relatively small amount of time (e.g., 1-2 minutes) that will elapse and the distance (e.g., 15-20 miles) that will be travelled during the transition from the first flight operation to the second flight operation. In this context, the computing device 100 might cause the aircraft 300 to perform the second flight operation in response to making the determination (e.g., after confirming that the air temperature difference will be less than the threshold amount).

In a similar fashion, the computing device 100 can make a determination that a difference in wind speed outside the aircraft 300 during the first flight operation as compared to during the second flight operation will be less than a threshold amount (e.g., less than 1 mile per hour difference, less than 5% difference, etc.). Referring to FIGS. 3 and 4, for instance, the computing device 100 might determine that a wind speed 203 outside the aircraft 300 during the first flight operation will not differ significantly from a wind speed 205 outside the aircraft 300 during the second flight operation due to the relatively small amount of time (e.g., 1-2 minutes) that will elapse and distance (e.g., 15-20 miles) that will be travelled during the transition from the first flight operation to the second flight operation. In this context, the computing device 100 might cause the aircraft 300 to perform the second flight operation in response to making the determination (e.g., after confirming that the wind speed difference will be less than the threshold amount).

At block 208, the method 200 includes determining the second airspeed and a second thrust that caused the aircraft to perform the second flight operation, the second thrust being substantially constant during the second flight operation. For example, the computing device 100 can determine the second airspeed 308 and the second thrust 312 that caused the aircraft 300 to perform the second flight operation. In this context, the second thrust 312 is substantially constant during the second flight operation. In a specific example, the computing device 100 can determine the second airspeed 308 via the sensor(s) 113 (e.g., a pitot tube or another sensor configured to detect the airspeed of the aircraft 300). Also, the computing device 100 can determine the second thrust 312 by referring to engine power control commands that the computing device 100 sent to the engines or propellers of the aircraft 300 during the second flight operation. For example, the computing device 100 can access data that maps engine or propeller power settings to thrust levels. In this context, determining the second thrust might include determining the engine or propeller power settings that were used to perform the second flight operation without directly determining a thrust force.

In some examples, the computing device 100 can select an airspeed that is within a predetermined buffet airspeed protection range of the aircraft 300. The predetermined buffet airspeed protection range generally includes airspeeds at a given altitude and/or angle of attack that correspond to stable flying conditions at which stalling is not a concern. In this context, the second airspeed 308 will be equal to the airspeed selected by the computing device 100.

At block 210, the method 200 includes using the first thrust, the second thrust, the first airspeed, and the second airspeed to determine the gross weight of the aircraft. For example, the computing device 100 can use the first thrust 306 (or an engine or propeller power setting corresponding to the first thrust 306), the second thrust 312 (or an engine or propeller power setting corresponding to the second thrust 312), the first airspeed 302, and the second airspeed 308 to determine the gross weight 314 of the aircraft 300 at the time shown in FIG. 4 (e.g., during or soon after the aircraft 300 performs the second flight operation). Although the computing device 100 can use the first thrust 306, the second thrust 312, the first airspeed 302, and the second airspeed 308 to determine the gross weight 314 of the aircraft 300 in various ways, some of the physics related to that determination are described below. The equations (1)-(6) and other concepts described below amount to a predetermined set of rules that the computing device 100 can use to determine the gross weight 314 of the aircraft 300. The predetermined set of rules allow for automation of tasks that previously could not be automated, and thus are directed to improvements in computer functionality. Using these predetermined rules allows for the computing device 100 to determine a gross weight of an aircraft while the aircraft is in flight without using fuel flow sensor data or fuel tank sensor data that can be subject to error.

$$D_1 = \tfrac{1}{2} \rho V_1^2 C_D S \qquad (1)$$

$$D_2 = \tfrac{1}{2} \rho V_2^2 C_D S \qquad (2)$$

Equations (1) and (2) represent the drag equation applied to the situations depicted in FIG. 3 and FIG. 4, respectively. $D_1$ is the drag force 307, $D_2$ is the drag force 317, $\rho$ is the density of air 201 adjacent to the aircraft 300, $V_1$ is the first airspeed 302, $V_2$ is the second airspeed 308, $C_D$ is the drag coefficient of the aircraft 300, and S is the area of the wing 309. $C_D$ is assumed to be substantially the same during both the first flight operation and the second flight operation because the difference between $V_1$ and $V_2$ is assumed to be small enough (e.g., less than 0.001 Mach or less than 1 calibrated nautical mile per hour (KCAS)). The difference between $V_1$ and $V_2$ might be even larger. For a given aircraft, the relationship between $C_D$ and airspeed is generally known, and thus $V_1$ and $V_2$ could be any two airspeeds that correspond to substantially equal drag coefficients for the aircraft. As noted above, the density of the air 201 adjacent to the aircraft 300 is assumed to be the same during both the first flight operation and the second flight operation.

$$D_2 - D_1 = \tfrac{1}{2}\rho V_2^2 C_D S - \tfrac{1}{2}\rho V_1^2 C_D S = \tfrac{1}{2}\rho C_D S(V_2^2 - V_1^2) = T_2 - T_1 \qquad (3)$$

$$C_D = \frac{T_2 - T_1}{\tfrac{1}{2}\rho S(V_2^2 - V_1^2)} \qquad (4)$$

Equation (3) is derived from equations (1) and (2) and also from the fact that, based on the assumption that $V_1$ (the first airspeed 302) and $V_2$ (the second airspeed 308) are substantially constant, $D_1$ (the drag force 307) is equal to $T_1$ (the first thrust 306) and $D_2$ (the drag force 317) is equal to $T_2$ (the second thrust 312). Equation (4) that defines the drag coefficient $C_D$ is simply an alternative way of expressing equation (3).

Referring to equation (4), the computing device 100 can determine the drag coefficient $C_D$ that represents a quotient of (A) a difference between the first thrust 306 and the second thrust 312 ($T_2 - T_1$) divided by (B) one half of a multiplicative product of (i) the density of air 201 outside the aircraft 300, (ii) the area of the wing 309 of the aircraft 300, and (iii) a difference between a square of the first airspeed 302 and a square of the second airspeed 308 ($V_2^2 - V_1^2$).

In some cases, instead of directly determining both $T_1$ (the first thrust 306) and $T_2$ (the second thrust 312), the computing device 100 instead uses a known differential relationship between thrust force (T) provided by an engine or propeller of the aircraft 300 and the power setting (PS) of the engine or propeller to directly determine the difference between the first thrust 306 and the second thrust 312 ($T_2 - T_1$). This relationship is defined by equation (5) below, with $PS_1$ being the engine or propeller power setting during the first flight operation and with $PS_2$ being the engine or propeller power setting during the second flight operation.

$$T_2 - T_1 \approx \frac{\partial T}{\partial PS}(PS_2 - PS_1) \qquad (5)$$

Next, the computing device 100 can apply a known reverse drag polar function of the aircraft 300 to the drag coefficient $C_D$ to determine a lift coefficient $C_L$ of the aircraft 300 that applies during the second flight operation. The reverse polar drag function is a tabulated function that maps drag coefficient to lift coefficient for a particular aircraft. Once the lift coefficient $C_L$ of the aircraft 300 is determined, the computing device 100 can determine the lift force 315 acting on the aircraft 300 during the second flight operation, according to equation (6) below.

$$L = \tfrac{1}{2}\rho V_2^2 C_L S \qquad (6)$$

As such, the computing device 100 can multiply the lift coefficient $C_L$ by one half of a multiplicative product of (1) the density of the air 201 outside the aircraft 300, (2) the square of the second airspeed 308, and (3) the area of the wing 309 of the aircraft 300 to determine the lift force 315. Since the aircraft 300 is known to have a constant descent rate 310 during the second flight operation, the lift force 315 is equal to the gross weight 314 of the aircraft 300, and the process for determining the gross weight 314 of the aircraft 300 is complete. The determined gross weight 314 can be displayed or otherwise indicated by the user interface 110, for example.

In some examples, the computing device 100 determines, via the sensor(s) 113 (e.g., a pressure sensor), the density of the air 201 outside the aircraft 300 and uses the determined density $\rho$ to determine the gross weight 314 of the aircraft 300, as described above.

In particular embodiments, the computing device 100 makes a determination that the aircraft 300 is flying at a substantially constant airspeed (e.g., the first airspeed 302) and a substantially constant descent rate (e.g., the descent rate 304) and causes the aircraft 300 to perform the second flight operation in response to making the determination. That is, the computing device 100 can record the first airspeed 302, the first thrust 306, and/or the engine or propeller power setting in use during the first flight operation and subsequently cause the aircraft 300 to transition to performing the second flight operation so that the second airspeed 308, the second thrust 312, and/or the engine or propeller power setting in use during the second flight operation can be recorded as well. The computing device 100 can also cause the aircraft 300 to transition from the first flight operation to the second flight operation based on determining that the air temperature and/or wind speed adjacent to the aircraft 300 will not substantially change during the transition.

Additionally, the computing device 100 can perform functions related to checking the consistency of a set of (e.g., two, three, four, or five) sequentially determined gross weights of the aircraft 300 (e.g., gross weights determined as described above). For example, the computing device 100 can make a determination that no difference between any two gross weights of the set exceeds a predetermined amount (e.g., establishing that the determined gross weights are accurate), and provide, via the user interface 110, an indication of the most recently determined gross weight of the aircraft 300 in response to making the determination. The computing device 100 can make a determination that no difference between any two gross weights of the set exceeds 1,000 pounds, for example. By further example, the computing device 100 can provide, via the user interface 110, an indication that the set of determined gross weights of the aircraft 300 converge to a predetermined tolerance range in response to making the determination.

If there is a difference between two determined gross weights of the set that exceeds the threshold amount, the user interface 110 can provide a visual or audible indication that the set of determined gross weights of the aircraft 300 do not converge to the predetermined tolerance range (e.g., provide an error message).

In some examples, the computing device 100 might adjust an altitude, an airspeed, or another flight parameter of the aircraft 300 based on the determined gross weight 314 of the aircraft 300.

Additionally, the computing device 100 might perform one or more of blocks 202-210 in response to receiving an input (e.g., a user command) via the user interface 110.

In particular embodiments, the initial second airspeed selected by the computing device 100 might not be acceptable (e.g., the airspeed is not within the buffet speed protection range). Accordingly, the computing device 100 may attempt to select other airspeeds for the second flight operation. If the computing device 100 is unable to do so, the computing device 100 can provide an error indication via the user interface 110.

Also, the computing device 100 can display the determined gross weight 314 of the aircraft 300 as well as a gross weight of the aircraft determined by methods based on monitoring the amount of fuel remaining onboard and/or monitoring the amount of fuel that has flowed to the engines or propellers of the aircraft 300 during flight. The computing device 100 can also provide, via the user interface 110, an indication of whether the gross weight 314 determined via the method 200 is within a predetermined tolerance range of a gross weight determined via fuel monitoring methods.

Figure 5:
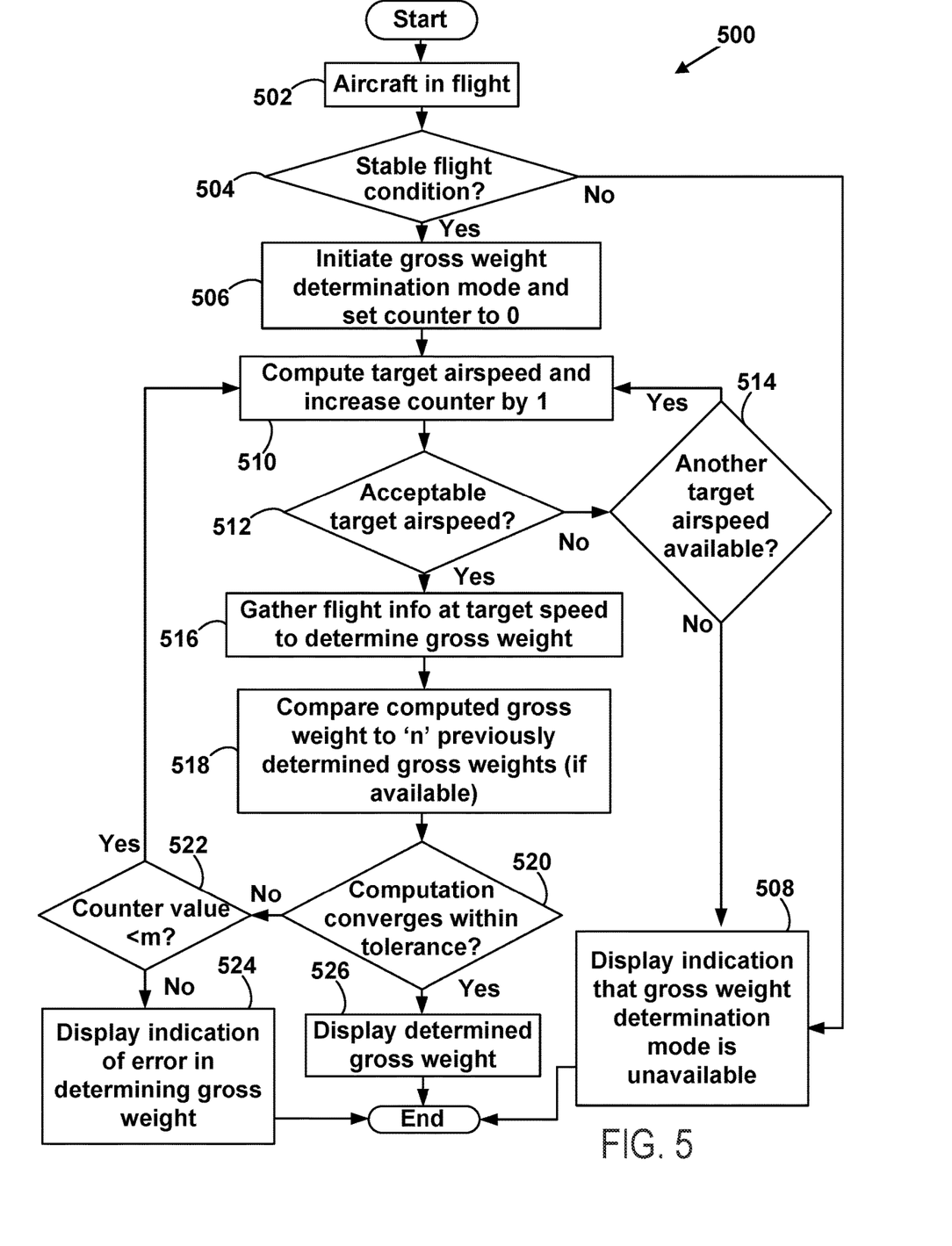
FIG. 5 is a block diagram of a method for in-flight determination of a gross weight of an aircraft, according to an example embodiment.

FIG. 5 is a block diagram of an example method 500 for in-flight determination of a gross weight of an aircraft. Any of the functionality described below with regard to the method 500 can be used in conjunction with the method 200 or related functions described above. Also, any of the functionality described above with regard to the method 200 can be used in conjunction with the method 500 or related functions described below.

At block 502, the computing device 100 and/or a pilot adjusting control levers, knobs, or dials etc. of a control panel of the aircraft 300 can cause the aircraft 300 to engage in flight by controlling the trajectory, airspeed, and/or attitude etc. of the aircraft 300.

At block 504, the computing device 100 can determine whether the aircraft 300 is engaged in stable flight (e.g., flying with a substantially constant descent rate and a substantially constant airspeed).

If the computing device 100 determines that the aircraft 300 is engaged in stable flight, the computing device 100 can perform block 506 to initiate a gross weight determination mode and set a counter to zero. The counter (e.g., stored at the computer-readable medium 104) stores a number representing a number of times in a particular cycle that the computing device 100 has attempted to compute a gross weight of the aircraft 300.

If the computing device 100 determines that the aircraft 300 is not engaged in stable flight, at block 508 the computing device 100 can display or otherwise provide an indication that the gross weight determination mode is unavailable.

Following block 506, the computing device 100 can perform block 510 by computing a target airspeed for the aircraft 300 and increasing the counter by 1.

At block 512, the computing device 100 determines whether the target airspeed is acceptable (e.g., within a predetermined buffet airspeed protection range of the aircraft 300) and, if so, can proceed to block 516. If the target airspeed is determined to be unacceptable, the computing device 100 can perform block 514 by determining whether another target airspeed is available. If another target airspeed is available, the computing device can repeat block 510. If another target airspeed is not available, the computing device 100 can proceed to block 508.

At block 516, the computing device 100 gathers flight information (e.g., the first airspeed 302, the second airspeed 308, the first thrust 306, the second thrust 312, the density of the air 201 etc.) and uses the flight information to determine the gross weight 314 of the aircraft 300 as described above.

At block 518, the computing device 100 compares the determined gross weight 314 to 'n' gross weights of the aircraft 300 that were determined previously in a manner similar to block 516 (if available).

At block 520, the computing device 100 determines whether the determined n+1 gross weights of the aircraft 300 converge to within a predetermined tolerance range. If not, the computing device 100 performs block 522 and determines whether the counter value is less than 'm,' which is a predetermined integer threshold. If the counter value is less than m, the computing device 100 reverts back to block 510. If the counter value exceeds m, the computing device 100 can proceed to block 524 to display or otherwise provide an indication of error in determining the gross weight of the aircraft 300. If, at block 520, the n+1 gross weights of the aircraft 300 converge to within the predetermined tolerance range, the computing device 100 can proceed to block 526 to display or otherwise provide an indication of the determined gross weight 314.

Implementations of this disclosure provide technological improvements that are particular to computer functionality on aircrafts, for example, those concerning more accurate in-flight determination of a gross weight of an aircraft. Aircraft computer technological problems, such as the relative unreliability of fuel flow or fuel tank sensor data used in current methods for in-flight determination of gross weight, can be wholly or partially solved by implementations of this disclosure. For example, implementation of this disclosure allows for in-flight determination of gross weight by determining and using the aircraft's airspeed and thrust during two flight operations, which leads to more accurate determination of gross weight by not being dependent on fuel sensor data. Implementations of this disclosure can thus introduce new and efficient improvements in the ways in which the gross weight of an aircraft can be determined while in flight.

Embodiments of the present disclosure can thus relate to one of the enumerated example embodiment (EEEs) listed below.

EEE 1 is a computing device comprising: one or more processors; and a computer-readable medium storing instructions that, when executed by the one or more processors, cause the computing device to perform functions for in-flight determination of a gross weight of an aircraft, the functions comprising: causing the aircraft to perform a first flight operation defined by a first airspeed that is substantially constant and a descent rate that is substantially constant; determining the first airspeed and a first thrust that caused the aircraft to perform the first flight operation, the first thrust being substantially constant during the first flight operation; causing the aircraft to perform a second flight operation defined by a second airspeed that is substantially constant and a descent rate that is substantially constant; determining the second airspeed and a second thrust that caused the aircraft to perform the second flight operation, the second thrust being substantially constant during the second flight operation; and using the first thrust, the second thrust, the first airspeed, and the second airspeed to determine the gross weight of the aircraft.

EEE 2 is the computing device of EEE 1, wherein using the first thrust, the second thrust, the first airspeed, and the second airspeed to determine the gross weight of the aircraft comprises determining a drag coefficient of the aircraft that represents a quotient of (A) a difference between the first thrust and the second thrust divided by (B) one half of a multiplicative product of (i) a density of air outside the aircraft, (ii) an area of a wing of the aircraft, and (iii) a difference between a square of the first airspeed and a square of the second airspeed.

EEE 3 is the computing device of EEE 2, wherein using the first thrust, the second thrust, the first airspeed, and the second airspeed to determine the gross weight of the aircraft comprises applying a reverse drag polar function of the aircraft to the drag coefficient to determine a lift coefficient of the aircraft.

EEE 4 is the computing device of EEE 3, wherein using the first thrust, the second thrust, the first airspeed, and the second airspeed to determine the gross weight of the aircraft comprises multiplying the lift coefficient by one half of a multiplicative product of (1) the density of air outside the aircraft, (2) the square of the second airspeed, and (3) the area of the wing of the aircraft to determine the gross weight of the aircraft.

EEE 5 is the computing device of any of EEEs 2-4, the functions further comprising: determining, via a sensor, the density of air outside the aircraft; and using the determined density to determine the gross weight of the aircraft.

EEE 6 is the computing device of any of EEEs 1-5, the functions further comprising: making a determination that the aircraft is flying at a substantially constant airspeed and a substantially constant descent rate, wherein causing the aircraft to perform the second flight operation comprises causing the aircraft to perform the second flight operation in response to making the determination.

EEE 7 is the computing device of any of EEEs 1-6, the functions further comprising: selecting an airspeed that is within a predetermined buffet airspeed protection range of the aircraft, wherein the second airspeed is the selected airspeed.

EEE 8 is the computing device of any of EEEs 1-7, wherein a difference between a drag coefficient of the aircraft at the first airspeed and a drag coefficient of the aircraft at the second airspeed is substantially zero.

EEE 9 is the computing device of any of EEEs 1-8, wherein the descent rate of the first flight operation is negative and the descent rate of the second flight operation is negative.

EEE 10 is the computing device of any of EEEs 1-9, wherein the descent rate of the first flight operation is substantially equal to zero and the descent rate of the second flight operation is substantially equal to zero.

EEE 11 is the computing device of any of EEEs 1-10, wherein the descent rate of the first flight operation is positive and the descent rate of the second flight operation is positive.

EEE 12 is the computing device of any of EEEs 1-11, the functions further comprising: making a determination that a difference in air temperature outside the aircraft during the first flight operation and during the second flight operation will be less than a threshold amount, wherein causing the aircraft to perform the second flight operation comprises causing the aircraft to perform the second flight operation in response to making the determination.

EEE 13 is the computing device of any of EEEs 1-12, the functions further comprising: making a determination that a difference in wind speed outside the aircraft during the first flight operation and during the second flight operation will be less than a threshold amount, wherein causing the aircraft to perform the second flight operation comprises causing the aircraft to perform the second flight operation in response to making the determination.

EEE 14 is the computing device of any of EEEs 1-13, wherein the gross weight of the aircraft and one or more previously determined gross weights of the aircraft form a set of determined gross weights of the aircraft, the functions further comprising: making a determination that no difference between any two gross weights of the set exceeds a predetermined amount; and providing, via a user interface, an indication of the gross weight of the aircraft in response to making the determination.

EEE 15 is the computing device of EEE 14, the functions further comprising providing, via the user interface, an indication that the set of determined gross weights of the aircraft converge to a predetermined tolerance range in response to making the determination.

EEE 16 is the computing device of any of EEEs 1-15, wherein the gross weight of the aircraft and one or more previously determined gross weights of the aircraft form a set of determined gross weights of the aircraft, the functions further comprising: making a determination that a difference between two gross weights of the set exceeds a predetermined amount; and providing, via a user interface, an indication that the set of determined gross weights of the aircraft do not converge to a predetermined tolerance range.

EEE 17 is the computing device of any of EEEs 1-16, wherein determining the first thrust comprises computing the first thrust based on an engine power setting that was used during the first flight operation, or wherein determining the second thrust comprises computing the second thrust based on an engine power setting that was used during the second flight operation.

EEE 18 is the computing device of any of EEEs 1-17, the functions further comprising adjusting an altitude or an airspeed of the aircraft based on the gross weight of the aircraft.

EEE 19 is a non-transitory computer readable medium storing instructions that, when executed by a computing device, cause the computing device to perform functions for in-flight determination of a gross weight of an aircraft, the functions comprising: causing an aircraft to perform a first flight operation defined by a first airspeed that is substantially constant and a descent rate that is substantially constant; determining the first airspeed and a first thrust that caused the aircraft to perform the first flight operation, the first thrust being substantially constant during the first flight operation; causing the aircraft to perform a second flight operation defined by a second airspeed that is substantially constant and a descent rate that is substantially constant; determining the second airspeed and a second thrust that caused the aircraft to perform the second flight operation, the second thrust being substantially constant during the second flight operation; and using the first thrust, the second thrust, the first airspeed, and the second airspeed to determine the gross weight of the aircraft.

EEE 20 is a method for in-flight determination of a gross weight of an aircraft, the method comprising: causing an aircraft to perform a first flight operation defined by a first airspeed that is substantially constant and a descent rate that is substantially constant; determining the first airspeed and a first thrust that caused the aircraft to perform the first flight operation, the first thrust being substantially constant during the first flight operation; causing the aircraft to perform a second flight operation defined by a second airspeed that is substantially constant and a descent rate that is substantially constant; determining the second airspeed and a second thrust that caused the aircraft to perform the second flight operation, the second thrust being substantially constant during the second flight operation; and using the first thrust, the second thrust, the first airspeed, and the second airspeed to determine the gross weight of the aircraft.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A computing device comprising:
   one or more processors; and
   a computer-readable medium storing instructions that, when executed by the one or more processors, cause the computing device to perform functions for in-flight determination of a gross weight of an aircraft, the functions comprising:
      causing the aircraft to perform a first flight operation defined by a first airspeed that is substantially constant and a descent rate that is substantially constant;
      determining the first airspeed and a first thrust that caused the aircraft to perform the first flight operation, the first thrust being substantially constant during the first flight operation;
      causing the aircraft to perform a second flight operation defined by a second airspeed that is substantially constant and a descent rate that is substantially constant;
      determining the second airspeed and a second thrust that caused the aircraft to perform the second flight operation, the second thrust being substantially constant during the second flight operation; and
      using the first thrust, the second thrust, the first airspeed, and the second airspeed to determine the gross weight of the aircraft.

2. The computing device of claim 1, wherein using the first thrust, the second thrust, the first airspeed, and the second airspeed to determine the gross weight of the aircraft comprises determining a drag coefficient of the aircraft that represents a quotient of (A) a difference between the first thrust and the second thrust divided by (B) one half of a multiplicative product of (i) a density of air outside the aircraft, (ii) an area of a wing of the aircraft, and (iii) a difference between a square of the first airspeed and a square of the second airspeed.

3. The computing device of claim 2, wherein using the first thrust, the second thrust, the first airspeed, and the second airspeed to determine the gross weight of the aircraft comprises applying a reverse drag polar function of the aircraft to the drag coefficient to determine a lift coefficient of the aircraft.

4. The computing device of claim 3, wherein using the first thrust, the second thrust, the first airspeed, and the second airspeed to determine the gross weight of the aircraft comprises multiplying the lift coefficient by one half of a multiplicative product of (1) the density of air outside the aircraft, (2) the square of the second airspeed, and (3) the area of the wing of the aircraft to determine the gross weight of the aircraft.

5. The computing device of claim 2, the functions further comprising:
   determining, via a sensor, the density of air outside the aircraft; and
   using the determined density to determine the gross weight of the aircraft.

6. The computing device of claim 1, the functions further comprising:
   making a determination that the aircraft is flying at a substantially constant airspeed and a substantially constant descent rate,
   wherein causing the aircraft to perform the second flight operation comprises causing the aircraft to perform the second flight operation in response to making the determination.

7. The computing device of claim 1, the functions further comprising:
   selecting an airspeed that is within a predetermined buffet airspeed protection range of the aircraft,
   wherein the second airspeed is the selected airspeed.

8. The computing device of claim 1, wherein a difference between a drag coefficient of the aircraft at the first airspeed and a drag coefficient of the aircraft at the second airspeed is substantially zero.

9. The computing device of claim 1, wherein the descent rate of the first flight operation is negative and the descent rate of the second flight operation is negative.

10. The computing device of claim 1, wherein the descent rate of the first flight operation is substantially equal to zero and the descent rate of the second flight operation is substantially equal to zero.

11. The computing device of claim 1, wherein the descent rate of the first flight operation is positive and the descent rate of the second flight operation is positive.

12. The computing device of claim 1, the functions further comprising:
   making a determination that a difference in air temperature outside the aircraft during the first flight operation and during the second flight operation will be less than a threshold amount,
   wherein causing the aircraft to perform the second flight operation comprises causing the aircraft to perform the second flight operation in response to making the determination.

13. The computing device of claim 1, the functions further comprising:
   making a determination that a difference in wind speed outside the aircraft during the first flight operation and during the second flight operation will be less than a threshold amount,
   wherein causing the aircraft to perform the second flight operation comprises causing the aircraft to perform the second flight operation in response to making the determination.

14. The computing device of claim 1, wherein the gross weight of the aircraft and one or more previously determined gross weights of the aircraft form a set of determined gross weights of the aircraft, the functions further comprising:
   making a determination that no difference between any two gross weights of the set exceeds a predetermined amount; and
   providing, via a user interface, an indication of the gross weight of the aircraft in response to making the determination.

15. The computing device of claim 14, the functions further comprising providing, via the user interface, an indication that the set of determined gross weights of the aircraft converge to a predetermined tolerance range in response to making the determination.

16. The computing device of claim 1, wherein the gross weight of the aircraft and one or more previously determined gross weights of the aircraft form a set of determined gross weights of the aircraft, the functions further comprising:
- making a determination that a difference between two gross weights of the set exceeds a predetermined amount; and
- providing, via a user interface, an indication that the set of determined gross weights of the aircraft do not converge to a predetermined tolerance range.

17. The computing device of claim 1,
- wherein determining the first thrust comprises computing the first thrust based on an engine power setting that was used during the first flight operation, or
- wherein determining the second thrust comprises computing the second thrust based on an engine power setting that was used during the second flight operation.

18. The computing device of claim 1, the functions further comprising adjusting an altitude or an airspeed of the aircraft based on the gross weight of the aircraft.

19. A non-transitory computer readable medium storing instructions that, when executed by a computing device, cause the computing device to perform functions for in-flight determination of a gross weight of an aircraft, the functions comprising:
- causing an aircraft to perform a first flight operation defined by a first airspeed that is substantially constant and a descent rate that is substantially constant;
- determining the first airspeed and a first thrust that caused the aircraft to perform the first flight operation, the first thrust being substantially constant during the first flight operation;
- causing the aircraft to perform a second flight operation defined by a second airspeed that is substantially constant and a descent rate that is substantially constant;
- determining the second airspeed and a second thrust that caused the aircraft to perform the second flight operation, the second thrust being substantially constant during the second flight operation; and
- using the first thrust, the second thrust, the first airspeed, and the second airspeed to determine the gross weight of the aircraft.

20. A method for in-flight determination of a gross weight of an aircraft, the method comprising:
- causing an aircraft to perform a first flight operation defined by a first airspeed that is substantially constant and a descent rate that is substantially constant;
- determining the first airspeed and a first thrust that caused the aircraft to perform the first flight operation, the first thrust being substantially constant during the first flight operation;
- causing the aircraft to perform a second flight operation defined by a second airspeed that is substantially constant and a descent rate that is substantially constant;
- determining the second airspeed and a second thrust that caused the aircraft to perform the second flight operation, the second thrust being substantially constant during the second flight operation; and
- using the first thrust, the second thrust, the first airspeed, and the second airspeed to determine the gross weight of the aircraft.

* * * * *